(12) United States Patent
Yang et al.

(10) Patent No.: US 12,602,631 B2
(45) Date of Patent: Apr. 14, 2026

(54) INTELLIGENT INTERACTIVE DECISION-MAKING METHOD FOR DISCRETE MANUFACTURING SYSTEM

(71) Applicant: NANJING UNIVERSITY OF POSTS AND TELECOMMUNICATIONS, Jiangsu (CN)

(72) Inventors: Haigen Yang, Jiangsu (CN); Donghuang Lin, Jiangsu (CN); Mei Wang, Anhui (CN); Luyang Li, Anhui (CN); Cong Wang, Jiangsu (CN); Jixin Liu, Jiangsu (CN); Fanyu Zeng, Jiangsu (CN); Yan Ge, Jiangsu (CN)

(73) Assignee: NANJING UNIVERSITY OF POSTS AND TELECOMMUNCIATIONS, Jiangsu (CN)

( * ) Notice: Subject to any disclaimer, the term of this patent is extended or adjusted under 35 U.S.C. 154(b) by 179 days.

(21) Appl. No.: 18/290,808

(22) PCT Filed: Apr. 4, 2023

(86) PCT No.: PCT/CN2023/086103
§ 371 (c)(1),
(2) Date: Jan. 22, 2024

(87) PCT Pub. No.: WO2024/113585
PCT Pub. Date: Jun. 6, 2024

(65) Prior Publication Data
US 2025/0094889 A1      Mar. 20, 2025

(30) Foreign Application Priority Data

Nov. 30, 2022    (CN) ........................ 202211518004.X

(51) Int. Cl.
G06Q 10/0631 (2023.01)
G06N 3/092 (2023.01)
G06Q 50/04 (2012.01)

(52) U.S. Cl.
CPC ....... *G06Q 10/06311* (2013.01); *G06N 3/092* (2023.01); *G06Q 50/04* (2013.01)

(58) Field of Classification Search
CPC ........... G06Q 10/00–50/00; G06N 3/00–20/00
(Continued)

(56) References Cited

U.S. PATENT DOCUMENTS

2004/0073764 A1* 4/2004 Andreasson ........ G06F 12/0253
711/170
2019/0324822 A1* 10/2019 Gottin ................... G06F 9/4401
(Continued)

FOREIGN PATENT DOCUMENTS

CN       111515961       8/2020
CN       115333143       11/2022
(Continued)

OTHER PUBLICATIONS

Fujimoto, Scott, et al. "Benchmarking batch deep reinforcement learning algorithms." arXiv preprint arXiv:1910.01708 (2019). (Year: 2019).*
(Continued)

*Primary Examiner* — Alan S Miller
(74) *Attorney, Agent, or Firm* — JCIPRNET

(57) ABSTRACT

Disclosed is an intelligent interactive decision-making method for a discrete manufacturing system. The method includes the following steps: step 1, establishing a production scheduling optimization model and strategy for discrete manufacturing for an actual application scene; step 2, training the scheduling strategy with existing production data on the basis of a deep reinforcement learning algorithm, and (Continued)

Establish a discrete production optimization model

On the basis of a deep reinforcement learning network training strategy

Input a state having a high reward into a memory

Update a state according to prior knowledge of a memory storing a state having a high reward in a training process in a memory; step 3, updating the state according to prior knowledge in the memory; step 4, inputting the updated state into a deep reinforcement learning network, obtaining a corresponding reward, and updating the memory according to the reward; and step 5, repeating step 4 until model parameters converge, and saving and putting the model into an actual production scene.

7 Claims, 2 Drawing Sheets

(58) Field of Classification Search
USPC ................................................ 705/7.11–7.42
See application file for complete search history.

(56) References Cited

U.S. PATENT DOCUMENTS

| | | | | |
|---|---|---|---|---|
| 2019/0325304 A1* | 10/2019 | Gottin | .................... | G06N 3/045 |
| 2020/0241511 A1* | 7/2020 | Zheng | .............. | G05B 19/41865 |
| 2021/0278825 A1* | 9/2021 | Wen | ................ | G05B 19/41865 |
| 2023/0359155 A1* | 11/2023 | Schockaert | ............... | F27B 1/26 |

FOREIGN PATENT DOCUMENTS

| | | |
|---|---|---|
| CN | 115796364 | 3/2023 |
| WO | 2022069498 | 4/2022 |

OTHER PUBLICATIONS

Liu, Chien-Liang, Chuan-Chin Chang, and Chun-Jan Tseng. "Actor-critic deep reinforcement learning for solving job shop scheduling problems." Ieee Access 8 (2020): 71752-71762. (Year: 2020).*

J. Zhu, H. Wang and T. Zhang, "A Deep Reinforcement Learning Approach to the Flexible Flowshop Scheduling Problem with Makespan Minimization," 2020 IEEE 9th Data Driven Control and Learning Systems Conference (DDCLS) (Year: 2020).*

Del Real Torres, Alejandro, et al. "A review of deep reinforcement learning approaches for smart manufacturing in industry 4.0 and 5.0 framework." Applied Sciences 12.23 (2022): 12377. (Year: 2022).*

Zhou, Longfei, Lin Zhang, and Berthold KP Horn. "Deep reinforcement learning-based dynamic scheduling in smart manufacturing." Procedia Cirp 93 (2020): 383-388. (Year: 2020).*

Zhao, Yejian, et al. "Dynamic jobshop scheduling algorithm based on deep Q network." IEEE Access 9 (2021): 122995-123011. (Year: 2021).*

"International Search Report (Form PCT/ISA/210) of PCT/CN2023/086103," mailed on Aug. 1, 2023, pp. 1-3.

"Written Opinion of the International Searching Authority (Form PCT/ISA/237) of PCT/CN2023/086103," mailed on Aug. 1, 2023, pp. 1-5.

* cited by examiner

INTELLIGENT INTERACTIVE DECISION-MAKING METHOD FOR DISCRETE MANUFACTURING SYSTEM

CROSS-REFERENCE TO RELATED APPLICATION

This application is a 371 of international application of PCT application serial no. PCT/CN2023/086103, filed on Apr. 4, 2023, which claims the priority benefit of China application no. 202211518004.X, filed on Nov. 30, 2022. The entirety of each of the above-mentioned patent application is hereby incorporated by reference herein and made a part of this specification.

BACKGROUND

Technical Field

The present disclosure relates to the technical field of computer data science, and particularly relates to an intelligent interactive decision-making method for a discrete manufacturing system.

Description of Related Art

Development of national economy has promoted China's discrete manufacturing industry to a new industrialization road. Nowadays, the discrete manufacturing industry multiple in variety, small in batch and short in delivery time has a long and complex production flow and a flexible and changeable production mode. Its production process is easily disturbed by dynamic events. This problem is a challenge to intelligent decision-making and quick response ability of manufacturing enterprises. Therefore, how to rapidly allocate production resources through intelligent decision-making and further improve production ability is a research hotspot in the field of discrete manufacturing. Its implementation method has very important practical significance and application value.

Existing intelligent decision-making methods are mostly based on assumption of static production environments. That is, information of a manufacturing workshop is completely known and not intended to change. However, dynamic factors exist in an existing discrete manufacturing process, such as operator flow, order insertion and return, and device failure. They will disturb an existing production scheduling solution, make a production state into chaos, and reduce production efficiency. Therefore, an intelligent decision-making method capable of dynamically scheduling a production process has very important practical significance.

At present, a production scheduling decision-making method based on a genetic algorithm has been widely used. The algorithm is a meta-heuristic algorithm that simulates Darwin's evolution process, which can be applied to solving various production problems. Through it, high-quality solutions can be obtained. However, this type of algorithm has a huge amount of computation, which will increase exponentially along with a problem scale. A training speed of the model is too low. In addition, it is only suitable for small and medium-sized dynamic scheduling problems, but cannot solve large-scale dynamic scheduling problems. Its practical application value is low.

SUMMARY

In order to solve technical problems, the present disclosure provides an intelligent interactive decision-making method for a discrete manufacturing system, which reduces a computation amount of model training with a memory mechanism, improves a speed of model training, and can obtain an optimal solution faster through iteration.

In order to solve the above technical problems, the present disclosure provides an intelligent interactive decision-making method for a discrete manufacturing system. The method includes the following steps:

step 1, establishing a production scheduling optimization model and strategy for discrete manufacturing for an actual application scene;

step 2, training the scheduling strategy with existing production data on the basis of a deep reinforcement learning algorithm, and storing a state having a high reward in a training process in a memory;

step 3, updating the state according to prior knowledge in the memory;

step 4, inputting the updated state into a deep reinforcement learning network, obtaining a corresponding reward, and updating the memory according to the reward; and step 5, repeating step 4 until model parameters converge, and saving and putting the model into an actual production scene.

Preferably, in step 1, the establishing a production scheduling optimization model and strategy for discrete manufacturing for an actual application scene specifically includes: transforming a discrete manufacturing production problem into a sequential decision-making problem according to an actual scheduling goal, defining a state, an action, a reward, exploration and a use strategy according to the goal, and determining a maximum product value in a production cycle as the goal, where the reward is a total value of products in a production cycle; the state includes manufacturing information such as a general type of products to be produced in a workshop, a production batch and a processing stage of each type of products, and processing time and a processing sequence of each product, machine and device state information such as processing devices allocated for products, a device load rate, and normal or faulty devices, and environmental states such as a temperature and a humidity of the workshop; and the action is to adjust the production scheduling strategy including a product processing sequence and allocated processing devices; and then selecting a suitable deep reinforcement learning algorithm framework according to the actual application scene, and establishing the production scheduling optimization model for discrete manufacturing.

Preferably, in step 2, the training the scheduling strategy with existing production data on the basis of a deep reinforcement learning algorithm, and storing a state having a high reward in a training process in a memory specifically includes: collecting production data of a certain production cycle from a discrete manufacturing workshop put into production as a pre-training sample, selecting the deep reinforcement learning algorithm, and training a production scheduling optimization model R for discrete manufacturing with the collected production data, where the production data sampled in a current workshop is input into the model, and the model outputs a decision-making solution for scheduling optimization of a workshop production line; and defining a memory D having capacity of M and configured to store a state-reward pair (s,r), where an action strategy formula used by a workshop state s to obtain the corresponding reward r is as follows:

$$a = \begin{cases} \underset{a_t}{\operatorname{argmin}} Q(s_t, a_t), & \varepsilon \\ \text{random}, & 1 - \varepsilon \end{cases}$$

In the formula, $Q(s_t, a_t)$ denotes an action value function. $s_t$ represents a current manufacturing workshop state. $a_t$ represents action scheduling to be used by a production workshop at a current moment. In the action strategy, an action is randomly selected for the current workshop state $s_t$ with a probability of $1-\varepsilon$, and alternatively, a q value of each action of the current state is evaluated according to the action value function Q with a probability of $\varepsilon$, a current optimal action a is selected, an optimal scheduling strategy a is executed for the current workshop state $s_t$, the reward $r_t$ and a next state $s_{t+1}$ are obtained, and the memory is updated.

Preferably, an updating process of the memory specifically includes:

(a) if the capacity of the memory D is not full and no $s_i(i=1,2,3,\ldots,M)$ similar to $s_t$ exists, entering a state-reward pair $(s_t, r_t)$, where a similarity computation formula is as follows:

$$Sim_{it} = \frac{s_i \cdot s_t}{\|s_i\|\|s_t\|}, \, s_i \in D$$

in the formula, $Sim_{it}$ represents similarity between $s_t$ and $s_i$, and if $Sim_{it} > \delta$, $s_i$ is considered to be similar to $s_t$, where $\delta$ denotes a threshold for determining the similarity; and (b) if $s_i$ similar to $s_t$ exists in the memory D, selecting the state having a higher reward for replacement, where an updating formula is as follows:

$$(s_i, r_i) = \begin{cases} (s_t, r_t), \, s_t \sim s_i \text{ and } r_t > r_i \\ (s_i, r_i), \, s_t \sim s_i \text{ and } r_t \le r_i \end{cases}$$

in the formula, $r_i$ denotes a reward corresponding to the state $s_i$, $r_t$ denotes a reward corresponding to the state $s_t$, and "~" represents similar; and finally, initialization of the memory is completed, M workshop states having a highest reward are stored in the memory, and it is indicated that the manufacturing workshop has a higher reward in the M states according to the collected actual production data, which is closer to a goal of production scheduling.

Preferably, in step 3, the updating the state according to prior knowledge in the memory specifically includes: collecting production data of production cycles different from step 1 from a discrete manufacturing workshop put into production as a training and updating sample, obtaining a high-reward state $s_m$ most similar to $s_t$ in the memory through similarity computation, obtaining a weighted sum of the state and $s_t$, obtaining a new workshop state $$s_t^*,$$

and using $$s_t^*$$

as input of a neural network R, where a specific formula is as follows:

$$s_t^* = \alpha s_t + \beta s_m$$

In the formula, $$s_t^*$$

denotes an updated new state. $s_t$ denotes a workshop state currently input. $s_m$ denotes a high-reward state most similar to $s_t$ from the memory. $\alpha$ and $\beta$ denote weight parameters. A selection formula of $s_m$ is as follows:

$$s_m = \underset{s_i}{\operatorname{argmax}}\left(\frac{s_i \cdot s_t}{\|s_i\|\|s_t\|}\right), \, s_i \in D$$

In the formula, $s_i$ denotes a workshop state recorded in the memory D.

In the above process, the existing high-reward state in the memory is used as the prior knowledge, such that a new state is generated. The workshop state is more likely to have a high reward value, that is, a better production result (shorter production time, lower production cost, etc.). In this way, an iterative convergence speed of the model is improved, and training time of the production scheduling optimization model for discrete manufacturing is reduced.

Preferably, in step 4, the inputting the updated state into a deep reinforcement learning network, obtaining a corresponding reward, and updating the memory according to the reward specifically includes: inputting the updated workshop state into the production scheduling optimization model R for discrete manufacturing, further optimizing an optimal strategy output by a network R, and updating the memory according to the reward corresponding to the state. A formula for obtaining the reward is as follows:

$$a = \begin{cases} \underset{a_t}{\operatorname{argmin}} Q(s_t^*, a_t), & \varepsilon \\ \text{random}, & 1 - \varepsilon \end{cases}$$

In the formula, $$Q(s_t^*, a_t)$$

denotes an action value function.

$$s_t^*$$

represents an updated manufacturing workshop state. $a_t$ represents a scheduling strategy used by a workshop. In the strategy, an action is randomly selected for a current state $s_t$ with a probability of $1-\varepsilon$, and alternatively, a q value of each action of the current state is evaluated according to the network Q with a probability of $\varepsilon$, a current optimal action a is selected, an optimal action a is executed for the current state $$s_t^*,$$

the reward $$r_t^*$$

and a next state $s_{t+1}$ are obtained, and the memory is updated.

Preferably, an updating process of the memory specifically includes:

(a) if $s_i$ similar to $$s_t^*$$

exists in the memory D, using an updating formula as follows:

$$(s_i, r_i) = \begin{cases} (s_t^*, r_t^*), \ s_t^* \sim s_i \text{ and } r_t^* > r_i \\ (s_i, r_i), \ s_t^* \sim s_i \text{ and } r_t^* \le r_i \end{cases}$$

(b) if no $s_i$ similar to $$s_t^*$$

exists in the memory D, traversing the memory D, selecting $(s_{min}, r_{min})$ having a lowest reward to replace a state having a higher reward. An updating formula is as follows:

$$(s_{min}, r_{min}) = \begin{cases} (s_t^*, r_t^*), \quad r_t^* > r_{min} \\ (s_{min}, r_{min}), \quad r_t^* \le r_{min} \end{cases}$$

In the formula, $s_i$ denotes a state recorded in the memory D.

Preferably, in step 5, the repeating step 4 until model parameters converge, and saving and putting the model into an actual production scene specifically includes: returning to step 3, repeating step 3 and step 4, continuously optimizing the memory D, quickly updating the production scheduling optimization model R through interaction between the memory D and the model R until parameters of the model R converge, which indicates that the production scheduling optimization model R reaches an optimal decision-making model, putting the model R into the manufacturing workshop, and intelligently deciding production scheduling of the workshop according to the production scheduling optimization model.

The present disclosure has the beneficial effects as follows: the present disclosure fully uses manufacturing big data, and learns an optimal strategy step by step during interaction with an environment, such that a requirement of adaptive adjustment of a workshop production state in the current field of discrete manufacturing is satisfied, intelligent decision-making of workshop production is achieved, an optimization strategy is interactively learned and updated, real-time decision-making regulation is ensured, and smooth operation of a workshop in a multi-disturbance environment is ensured. The problems that the model is complex and very difficult in solving and only suitable for small and medium-sized production scale in traditional accurate modeling methods are solved, and the present disclosure is suitable for large-scale dynamic scheduling decision-making. The memory mechanism is added, and a direction of decision-making learning is quickly adjusted according to the prior knowledge stored in the memory, such that an optimal decision can be obtained faster through iteration, a speed of model training can be improved, training cost can be reduced, it can be ensured that the model is put into production faster and the parameters can be adjusted faster to adapt to a dynamic production environment, and practical and economic value can be achieved.

DESCRIPTION OF THE EMBODIMENTS

Figure 1:
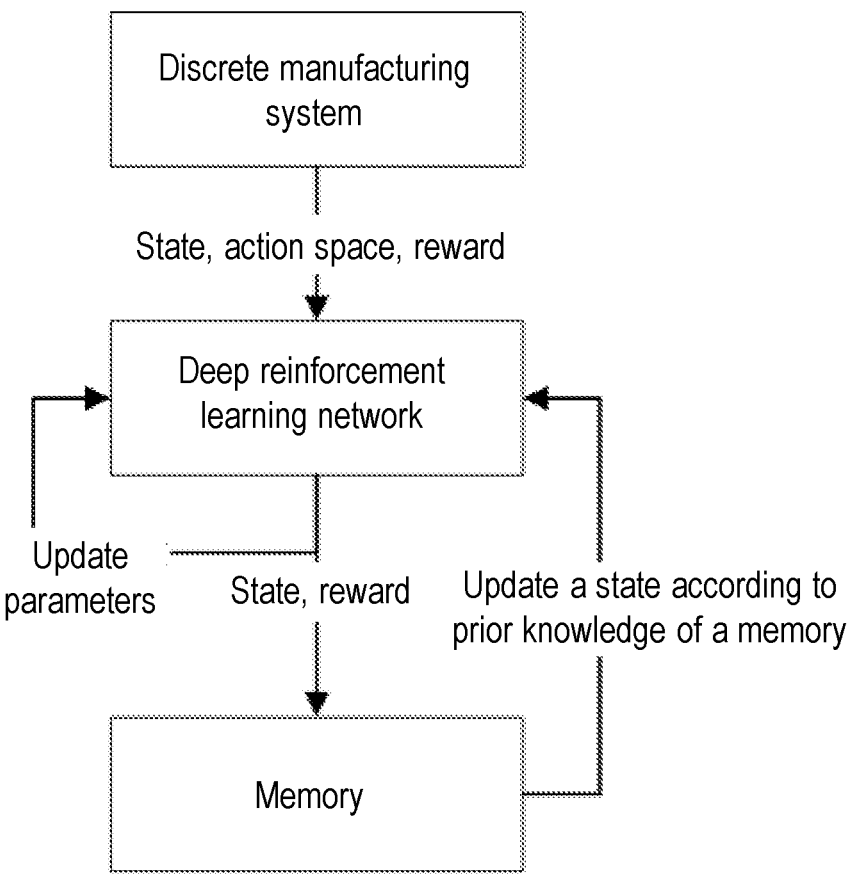
FIG. 1 is a schematic flow diagram of a deep reinforcement learning algorithm of the present disclosure.
Figure 2:
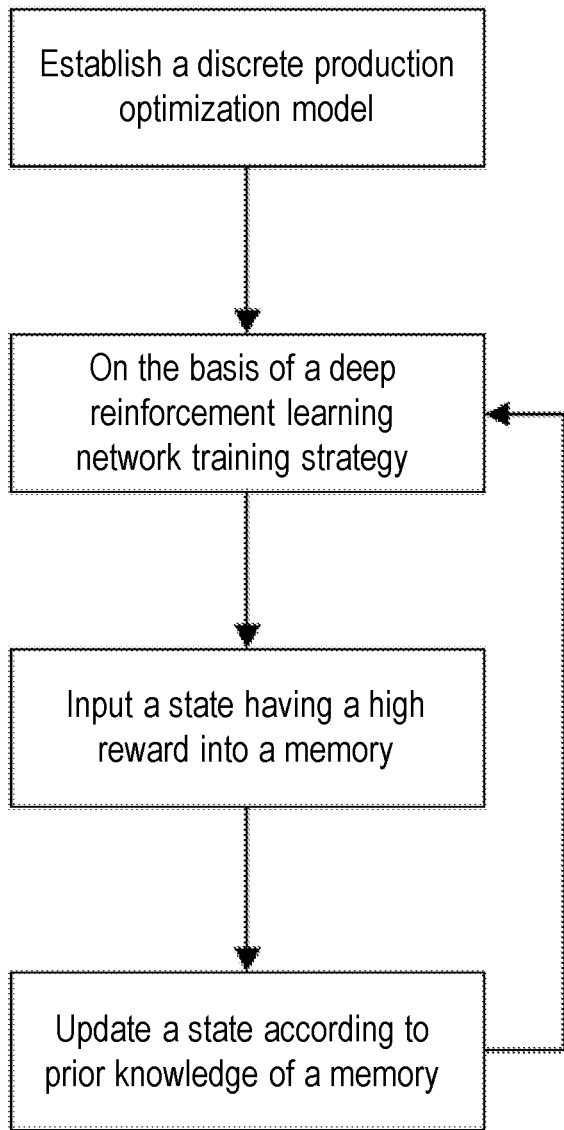
FIG. 2 is a schematic flow diagram of an intelligent interactive decision-making method for a discrete manufacturing system of the present disclosure.

As shown in FIGS. 1 and 2, an intelligent interactive decision-making method for a discrete manufacturing system includes the following steps:

step 1, a production scheduling optimization model and strategy for discrete manufacturing are established for an actual application scene;

step 2, the scheduling strategy is trained with existing production data on the basis of a deep reinforcement learning algorithm, and a state having a high reward in a training process is stored in a memory;

step 3, the state is updated according to prior knowledge in the memory;

step 4, the updated state is input into a deep reinforcement learning network, a corresponding reward is obtained, and the memory is updated according to the reward; and step 5, step 4 is repeated until model parameters converge, and the model is saved and put into an actual production scene.

In step 1, the production scheduling optimization model and strategy for discrete manufacturing are established for the actual application scene specifically as follows: a discrete manufacturing production problem is transformed into a sequential decision-making problem according to an actual scheduling goal, a state, an action, a reward, exploration and a use strategy are defined according to the goal, and a maximum product value in a production cycle is determined as the goal, where the reward is a total value of products in a production cycle; the state includes manufacturing information such as a general type of products to be produced in a workshop, a production batch and a processing stage of each type of products, and processing time and a processing sequence of each product, machine and device state information such as processing devices allocated for products, a device load rate, and normal or faulty devices, and environmental states such as a temperature and a humidity of the workshop; and the action is to adjust the production scheduling strategy including a product processing sequence and allocated processing devices; and then a suitable deep reinforcement learning algorithm framework is selected according to the actual application scene, and the production scheduling optimization model for discrete manufacturing is established.

In step 2, the scheduling strategy is trained with the existing production data on the basis of the deep reinforcement learning algorithm, and the state having a high reward in the training process is stored in the memory specifically as follows: production data of a certain production cycle is collected from a discrete manufacturing workshop put into production as a pre-training sample, the deep reinforcement learning algorithm is selected, and a production scheduling optimization model R for discrete manufacturing is trained with the collected production data, where the production data sampled in a current workshop is input into the model, and the model outputs a decision-making solution for scheduling optimization of a workshop production line; and a memory D having capacity of M and configured to store a state-reward pair (s,r) is defined, where an action strategy formula used by a workshop state s to obtain the corresponding reward r is as follows:

$$a = \begin{cases} \underset{a_t}{\mathrm{argmin}} Q(s_t, a_t), & \varepsilon \\ \mathrm{random}, & 1 - \varepsilon \end{cases}$$

In the formula, $Q(s_t, a_t)$ denotes an action value function. $s_t$ represents a current manufacturing workshop state. $a_t$ represents action scheduling to be used by a production workshop at a current moment. In the action strategy, an action is randomly selected for the current workshop state $s_t$ with a probability of $1-\varepsilon$, and alternatively, a q value of each action of the current state is evaluated according to the action value function Q with a probability of $\varepsilon$, a current optimal action a is selected, an optimal scheduling strategy a is executed for the current workshop state $s_t$, the reward $r_t$ and a next state $s_{t+1}$ are obtained, and the memory is updated.

An updating process of the memory is specifically as follows:

(a) if the capacity of the memory D is not full and no $s_i$(i=1,2,3, . . . , M) similar to $s_t$ exists, a state-reward pair $(s_t, r_t)$ is entered, where a similarity computation formula is as follows:

$$Sim_{it} = \frac{s_i \cdot s_t}{\|s_i\| \|s_t\|}, s_i \in D$$

in the formula, $Sim_{it}$ represents similarity between $s_t$ and $s_i$, and if $Sim_{it} > \delta$, $s_i$ is considered to be similar to $s_t$, where $\delta$ denotes a threshold for determining the similarity; and (b) if $s_i$ similar to $s_t$ exists in the memory D, the state having a higher reward is selected for replacement, where an updating formula is as follows:

$$(s_i, r_i) = \begin{cases} (s_t, r_t), s_t \sim s_i \text{ and } r_t > r_i \\ (s_i, r_i), s_t \sim s_i \text{ and } r_t \leq r_i \end{cases}$$

in the formula, $r_i$ denotes a reward corresponding to the state $s_i$, $r_t$ denotes a reward corresponding to the state $s_t$, and "~" represents similar; and finally, initialization of the memory is completed, M workshop states having a highest reward are stored in the memory, and it is indicated that the manufacturing workshop has a higher reward in the M states according to the collected actual production data, which is closer to a goal of production scheduling.

In step 3, the state is updated according to the prior knowledge in the memory specifically as follows: production data of production cycles different from step 1 is collected from a discrete manufacturing workshop put into production as a training and updating sample, a high-reward state $s_m$ most similar to $s_t$ in the memory is obtained through similarity computation, a weighted sum of the state and $s_t$ is obtained, a new workshop state $$s_t^*$$

is obtained, and $$s_t^*$$

is used as input of a neural network R. A specific formula is as follows:

$$s_t^* = \alpha s_t + \beta s_m$$

In the formula, $s_t^*$ denotes an updated new state. $s_t$ denotes a workshop state currently input. $s_m$ denotes a high-reward state most similar to $s_t$ from the memory. $\alpha$ and $\beta$ denote weight parameters. A selection formula of $s_m$ is as follows:

$$s_m = \underset{s_i}{\mathrm{argmax}} \left( \frac{s_i \cdot s_t}{\|s_i\| \|s_t\|} \right), s_i \in D$$

in the formula, $s_i$ denotes a workshop state recorded in the memory D.

In the above process, the existing high-reward state in the memory is used as the prior knowledge, such that a new state is generated. The workshop state is more likely to have a high reward value, that is, a better production result (higher economic benefits, lower production cost, etc.). In this way, an iterative convergence speed of the model is improved, and training time of the production scheduling optimization model for discrete manufacturing is reduced.

In step 4, the updated state is input into the deep reinforcement learning network, the corresponding reward is obtained, and the memory is updated according to the reward specifically as follows: the updated workshop state is input into the production scheduling optimization model R for discrete manufacturing, further an optimal strategy output by a network R is optimized, and the memory is updated according to the reward corresponding to the state. A formula for obtaining the reward is as follows:

$$a = \begin{cases} \underset{a_t}{\mathrm{argmin}} Q(s_t^*, a_t), & \varepsilon \\ \mathrm{random}, & 1 - \varepsilon \end{cases}$$

In the formula, $$Q(s_t^*, a_t)$$

denotes an action value function.

$$s_t^*$$

represents an updated manufacturing workshop state. $a_t$ represents a scheduling strategy used by a workshop. In the strategy, an action is randomly selected for a current state $s_t$ with a probability of $1-\varepsilon$, and alternatively, a q value of each action of the current state is evaluated according to the network Q with a probability of $\varepsilon$, a current optimal action a is selected, an optimal action a is executed for the current state $$s_t^*,$$

the reward $$r_t^*$$

and a next state $s_{t+1}$ are obtained, and the memory is updated.

An updating process of the memory is specifically as follows:

(a) if $s_i$ similar to $s_t^*$ exists in the memory D, an updating formula is used as follows:

$$(s_i, r_i) = \begin{cases} (s_t^*, r_t^*), & s_t^* \sim s_i \text{ and } r_t^* > r_i \\ (s_i, r_i), & s_t^* \sim s_i \text{ and } r_t^* \le r_i \end{cases}$$

(b) if no $s_i$ similar to $$s_t^*$$

exists in the memory D, traversing the memory, $(s_{min}, r_{min})$ having a lowest reward is selected to replace a state having a higher reward, where an updating formula is as follows:

$$(s_{min}, r_{min}) = \begin{cases} (s_t^*, r_t^*), & r_t^* > r_{min} \\ (s_{min}, r_{min}), & r_t^* \le r_{min} \end{cases}$$

In the formula, $s_i$ denotes a state recorded in the memory D.

In step 5, step 4 is repeated until model parameters converge, and the model is saved and put into an actual production scene specifically as follows: step 3 is returned to, step 3 and step 4 are repeated, the memory D is continuously optimized, the production scheduling optimization model R is quickly updated through interaction between the memory D and the model R until parameters of the model R converge, which indicates that the production scheduling optimization model R reaches an optimal decision-making model, the model R is put into the manufacturing workshop, and production scheduling of the workshop is intelligently decided according to the production scheduling optimization model.

What is claimed is:

1. An intelligent interactive decision-making method for a discrete manufacturing system, comprising following steps:

step 1, establishing a production scheduling optimization model and strategy for discrete manufacturing for an actual application scene;

step 2, training the scheduling strategy with existing production data on a basis of a deep reinforcement learning algorithm, and storing a state having a high reward in a training process in a memory;

step 3, updating the state according to a prior knowledge in the memory;

step 4, inputting the updated state into a deep reinforcement learning network, obtaining a corresponding reward, and updating the memory according to the reward; and step 5, repeating step 4 until parameters of the production scheduling optimization model converge, and saving and putting the production scheduling optimization model into an actual production scene, wherein in step 3, updating the state according to the prior knowledge in the memory specifically comprises: collecting the production data of production cycles different from step 1 from a discrete manufacturing workshop put into production as a training and updating sample, obtaining a high-reward state $s_m$ most similar to $s_t$ in the memory through a similarity computation, obtaining a weighted sum of the state and $s_t$, obtaining a new workshop state $$s_t^*,$$

and using $$s_t^*$$

as input of a neural network R, wherein a specific formula is as follows:

$$s_t^* = \alpha s_t + \beta s_m$$

in the formula, $$s_t^*$$

denotes an updated new state, $s_t$ denotes a workshop state currently input, $s_m$ denotes a high-reward state most similar to $s_t$ from the memory, and $\alpha$ and $\beta$ denote weight parameters, wherein a selection formula of $s_m$ is as follows:

$$s_m = \underset{s_i}{\mathrm{argmax}}\left(\frac{s_i \cdot s_t}{\|s_i\|\|s_t\|}\right), s_i \in D$$

in the formula, $s_i$ denotes a workshop state recorded in the memory D, wherein the high-reward state $s_m$ is used as the prior knowledge to generate the new workshop state $s_t^*$ with the high reward, such that an iterative convergence speed of the production scheduling optimization model is improved, and training time of the production scheduling optimization model for discrete manufacturing is reduced.

2. The intelligent interactive decision-making method for the discrete manufacturing system according to claim 1, wherein in step 1, establishing the production scheduling optimization model and strategy for discrete manufacturing for the actual application scene specifically comprises: transforming a discrete manufacturing production problem into a sequential decision-making problem according to an actual scheduling goal, defining the state, an action, the reward, an exploration and a use strategy according to the goal, and determining a maximum product value in a production cycle as the goal, wherein the reward is a total value of products in the production cycle; the state comprises manufacturing information such as a general type of products to be produced in a workshop, a production batch and a processing stage of each type of products, and a processing time and a processing sequence of each product, machine and device state information such as processing devices allocated for products, a device load rate, and normal or faulty devices, and environmental states such as a temperature and a humidity of the workshop; and the action is to adjust the production scheduling strategy comprising a product processing sequence and allocated processing devices; and then selecting a deep reinforcement learning algorithm framework according to the actual application scene, and establishing the production scheduling optimization model for discrete manufacturing.

3. The intelligent interactive decision-making method for the discrete manufacturing system according to claim 1, wherein in step 2, training the scheduling strategy with existing production data on the basis of the deep reinforcement learning algorithm, and storing the state having the high reward in the training process in the memory specifically comprises: collecting production data of a certain production cycle from a discrete manufacturing workshop put into production as a pre-training sample, selecting the deep reinforcement learning algorithm, and training the production scheduling optimization model for discrete manufacturing with the collected production data, wherein the production data sampled in a current workshop is input into the production scheduling optimization model, and the production scheduling optimization model outputs a decision-making solution for scheduling optimization of a workshop production line; and defining the memory D having capacity of M and configured to store a state-reward pair (s,r), wherein an action strategy formula used by a workshop state s to obtain the corresponding reward r is as follows:

$$a = \begin{cases} \underset{a_t}{\mathrm{argmin}} Q(s_t, a_t), & \varepsilon \\ \mathrm{random}, & 1 - \varepsilon \end{cases}$$

in the formula, $Q(s_t, a_t)$ denotes an action value function, wherein $s_t$ represents a current manufacturing workshop state, $a_t$ represents an action scheduling to be used by a production workshop at a current moment, and in the action strategy, an action is randomly selected for the current workshop state $s_t$ with a probability of $1-\varepsilon$, and alternatively, a q value of each action of the current state is evaluated according to the action value function Q with a probability of $\varepsilon$, a current optimal action a is selected, an optimal scheduling strategy a is executed for the current workshop state $s_t$, the reward $r_t$ and a next state $s_{t+1}$ are obtained, and the memory is updated.

4. The intelligent interactive decision-making method for the discrete manufacturing system according to claim 3, wherein an updating process of the memory specifically comprises:

(a) if the capacity of the memory D is not full and no $s_i(i=1,2,3, \ldots, M)$ similar to $s_t$ exists, entering a state-reward pair $(s_t, r_t)$, wherein a similarity computation formula is as follows:

$$Sim_{it} = \frac{s_i \cdot s_t}{\|s_i\|\|s_t\|}, s_i \in D$$

in the formula, $Sim_{it}$ represents similarity between $s_t$ and $s_i$, and if $Sim_{it} > \delta$, $s_i$ is considered to be similar to $s_t$, wherein $\delta$ denotes a threshold for determining the similarity; and (b) if $s_i$ similar to $s_t$ exists in the memory D, selecting the state having a higher reward for replacement, wherein an updating formula is as follows:

$$(s_i, r_i) = \begin{cases} (s_t, r_t), & s_t \sim s_i \text{ and } r_t > r_i \\ (s_i, r_i), & s_t \sim s_i \text{ and } r_t \le r_i \end{cases}$$

in the formula, $r_i$ denotes the reward corresponding to the state $s_i$, $r_t$ denotes the reward corresponding to the state $s_t$, and "~" represents similar; and finally, initialization of the memory is completed, M workshop states having a highest reward are stored in the memory, and it is indicated that the manufacturing workshop has a higher reward in the M states according to the collected actual production data, which is closer to a goal of production scheduling.

5. The intelligent interactive decision-making method for the discrete manufacturing system according to claim 1, wherein in step 4, inputting the updated state into the deep reinforcement learning network, obtaining the corresponding reward, and updating the memory according to the reward specifically comprises: inputting the updated workshop state into the production scheduling optimization model for discrete manufacturing, further optimizing an optimal strategy output by a network R, and updating the memory according to the reward corresponding to the state, wherein a formula for obtaining the reward is as follows:

$$a = \begin{cases} \underset{a_t}{\mathrm{argmin}} Q(s_t^*, a_t), & \varepsilon \\ \mathrm{random}, & 1 - \varepsilon \end{cases}$$

in the formula, $$Q(s_t^*, a_t)$$

denotes an action value function, wherein $$s_t^*$$

represents an updated manufacturing workshop state, $a_t$ represents a scheduling strategy used by a workshop, and in the strategy, an action is randomly selected for a current state $s_t$ with a probability of $1-\varepsilon$, and alternatively, a q value of each action of the current state is evaluated according to the network Q with a probability of $\varepsilon$, a current optimal action a is selected, an optimal action a is executed for the current state $$s_t^*,$$

the reward $$r_t^*$$

and a next state $s_{t+1}$ are obtained, and the memory is updated.

6. The intelligent interactive decision-making method for the discrete manufacturing system according to claim 5, wherein an updating process of the memory specifically comprises:

(a) if $s_i$ similar to $$s_t^*$$

exists in the memory D, using an updating formula as follows:

$$(s_i, r_i) = \begin{cases} (s_t^*, r_t^*), & s_t^* \sim s_i \text{ and } r_t^* > r_i \\ (s_i, r_i), & s_t^* \sim s_i \text{ and } r_t^* \le r_i \end{cases}$$

(b) if no $s_i$ similar to $$s_t^*$$

exists in the memory D, traversing the memory, selecting $(s_{min}, r_{min})$ having a lowest reward to replace the state having a higher reward, wherein an updating formula is as follows:

$$(s_{min}, r_{min}) = \begin{cases} (s_t^*, r_t^*), & r_t^* > r_{min} \\ (s_{min}, r_{min}), & r_t^* \le r_{min} \end{cases}$$

in the formula, $s_i$ denotes the state recorded in the memory D.

7. The intelligent interactive decision-making method for the discrete manufacturing system according to claim 1, wherein in step 5, repeating step 4 until the parameters of the production scheduling optimization model converge, and saving and putting the production scheduling optimization model into the actual production scene specifically comprises: returning to step 3, repeating step 3 and step 4, continuously optimizing the memory D, quickly updating the production scheduling optimization model through interaction between the memory D and the production scheduling optimization model until the parameters of the production scheduling optimization model converge, which indicates that the production scheduling optimization model reaches an optimal decision-making model, putting the production scheduling optimization model into the manufacturing workshop, and intelligently deciding production scheduling of the workshop according to the production scheduling optimization model.

* * * * *